United States Patent [19]
Moriyasu

[11] 3,879,669
[45] Apr. 22, 1975

[54] ADJUSTABLE TRIGGER LEVEL CONTROL CIRCUIT
[75] Inventor: Hiro Moriyasu, Portland, Oreg.
[73] Assignee: Tektronix, Inc., Beaverton, Oreg.
[22] Filed: Dec. 10, 1973
[21] Appl. No.: 423,380

Related U.S. Application Data
[63] Continuation of Ser. No. 164,904, July 21, 1971, abandoned, which is a continuation of Ser. No. 868,273, Oct. 8, 1969, abandoned, which is a continuation-in-part of Ser. No. 535,382, March 17, 1966, abandoned.

[52] U.S. Cl............. 328/146; 307/235 R; 328/150; 328/168; 328/187
[51] Int. Cl..... H03k 5/18; H03k 5/153; H03k 3/02
[58] Field of Search .......... 307/235, 237, 264, 317, 307/228; 328/146, 147, 150, 151, 168, 169, 178, 181, 175, 187; 330/28, 29, 69, 96, 110

[56] References Cited
UNITED STATES PATENTS
2,859,344  11/1958  Imm ............................ 328/165
2,999,925  9/1961  Thomas .......................... 328/54 X
3,074,020  1/1963  Ropiequet ..................... 307/235 X
3,223,851  12/1965  Kitchens et al................ 328/146 X
3,377,585  4/1968  Magnin ......................... 328/150 X
3,398,373  8/1968  Caswell......................... 307/235

FOREIGN PATENTS OR APPLICATIONS
706,715  4/1958  United Kingdom................ 328/150

Primary Examiner—Martin H. Edlow
Assistant Examiner—L. N. Anagnos
Attorney, Agent, or Firm—Adrian J. LaRue

[57] ABSTRACT

An amplifier means directly receives an input waveform, and this input waveform is also coupled to a pair of storage means for storing peak values thereof. An adjustable means selects a voltage from a range between such peak values and operates a control circuit means for causing the amplifier means to produce a triggering signal when the input waveform reaches a selected value.

17 Claims, 5 Drawing Figures

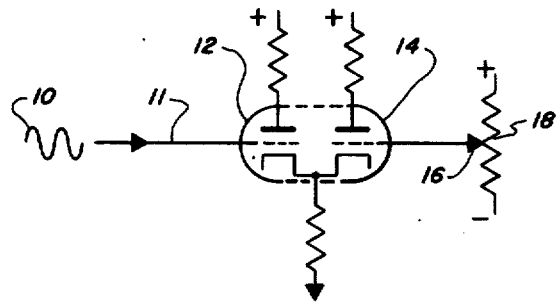
Fig. 1-(Prior Art)
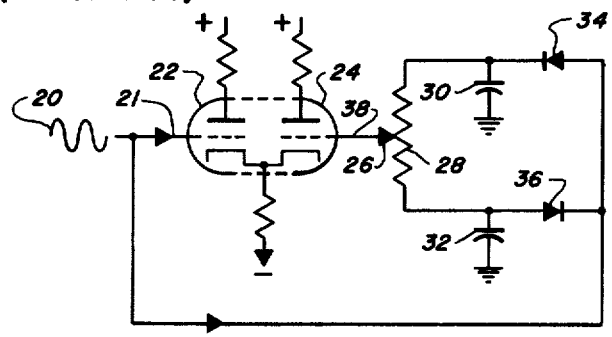
Fig. 2
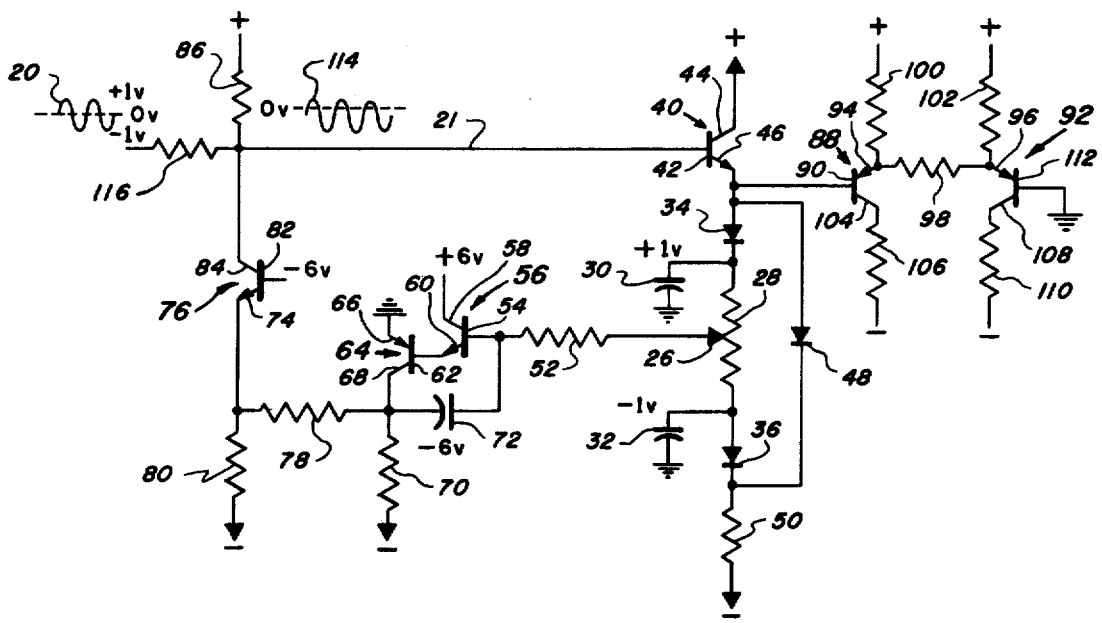
Fig. 3

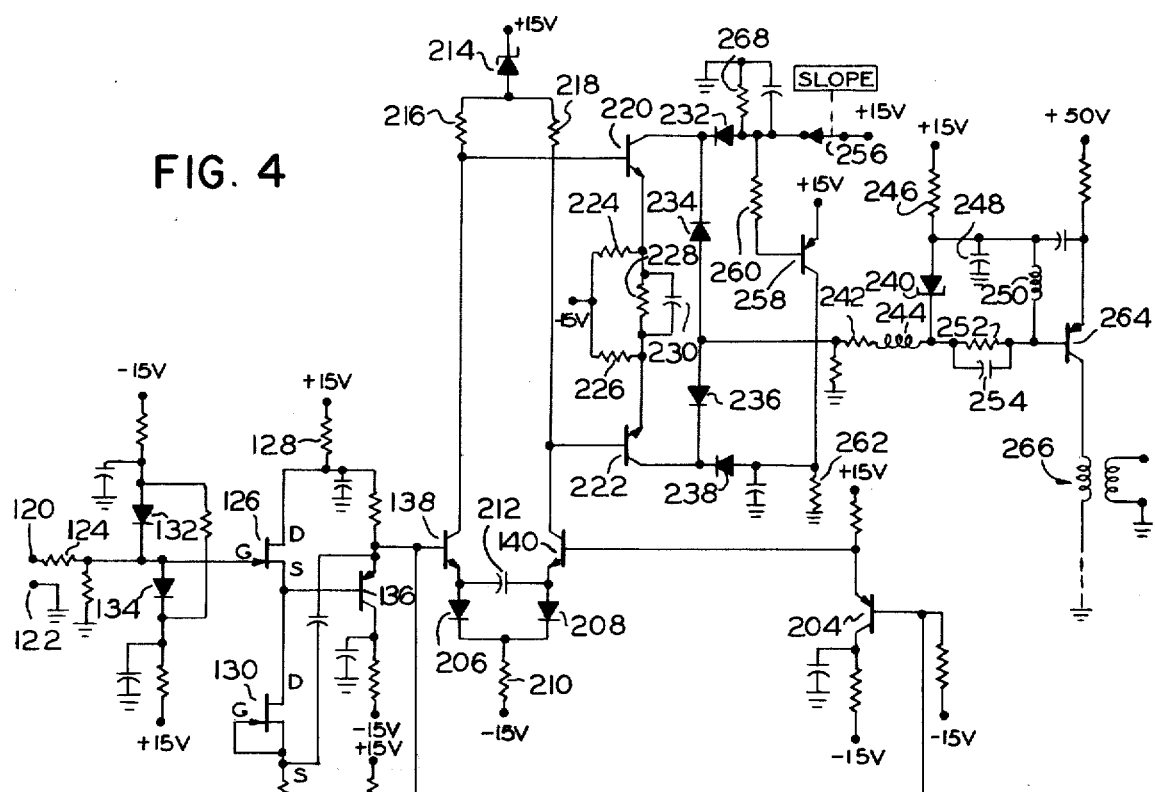
FIG. 4
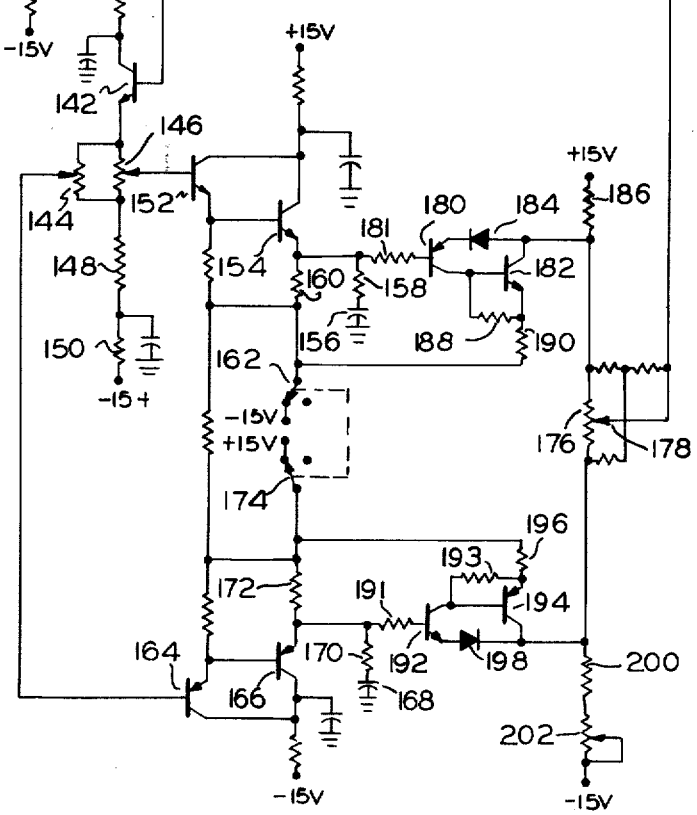
FIG. 5

ADJUSTABLE TRIGGER LEVEL CONTROL CIRCUIT

CROSS-REFERENCE TO RELATED APPLICATION

This application is a continuation of Ser. No. 164,904, filed July 21, 1971, now abandoned, which is a continuation of Ser. No. 868,273, filed Oct. 8, 1969, now abandoned, which in turn is a continuation-in-part of my application Ser. No. 535,382, filed Mar. 17, 1966, entitled "Trigger Level Control Circuit", now abandoned.

BACKGROUND OF THE INVENTION

In oscilloscope devices and the like, triggering signals are generated corresponding to repetitions of an input waveform and these triggering signals are employed for initiating the oscilloscope's horizontal sweep. According to the prior art, an input waveform is suitably compared with a given voltage level, and when the input waveform reaches such level, a trigger initiating output is produced. If the triggering level is to be selectable over the entire range of input waveform amplitude, the internal voltage range must always be greater than the largest voltage of the input waveform. Moreover, if a particular point on an input waveform is selected for triggering purposes, and the waveform then suffers a reduction in amplitude, triggering may be lost unless the internal comparison voltage is readjusted. Also, as the input signal changes in amplitude, triggering will take place relative to the same absolute value of comparison voltage rather than relative to a desired characteristic portion of the input waveform.

SUMMARY OF THE INVENTION

The present invention provides triggering relative to the input waveform itself rather than relative to a particular absolute voltage. Therefore, triggering may be adjusted to correspond to a given portion of the input waveform or a given percentage of the input waveform amplitude. Then, even though the input waveform vaires in amplitude, the triggering point remains substantially the same with respect to the waveform.

The circuit includes means for storing the amplitude extremities of the input signal as well as means for providing a variably adjustable output signal voltage relative to the stored extremes of the input signal. The variably adjustable voltage is then applied via a control circuit for controlling the level at which a trigger initiating output is produced. An input signal path couples the input signal to a direct coupled amplifier as an input thereof, and, in accordance with one embodiment, this amplifier also includes a control element to which the aforementioned control signal is applied via a control circuit path. A triggering or trigger initiating output is then produced by the aforementioned amplifier as its bias level is exceeded. In accordance with another embodiment of the present invention, the variably adjustable control signal is applied as a feedback current to the input signal path where it acts to position the input waveform relative to a fixed level. In either embodiment, unilateral conductors are preferably included to couple the extremes of the input waveform from the input path to storage elements for storing these extremes.

In the foregoing manner, a trigger initiating output is selectively generated relative to the input signal waveform itself and not relative to particular absolute voltage levels. Therefore, effective triggering will be obtained even though the input signal waveform may vary in amplitude. The input signal may also vary in frequency and waveshape without impeding accurate triggering when the circuit is d.c. coupled. Furthermore, the point or portion of the input signal waveform at which triggering is to take place is continuously variable or selectable over the entire amplitude of the input signal between the aforementioned extremities thereof.

It is an object of the present invention to provide an improved and effective trigger level control circuit for producing a trigger initiating output corresponding to a predetermined and selectable point in a continuously adjustable range between the extremities in amplitude of the input signal waveform itself.

It is another object of the present invention to provide an improved trigger level control circuit for effectively providing a trigger output relatively independent of changes in rate and amplitude of the input signal.

It is a further object of the present invention to provide an improved trigger level control circuit wherein the triggering level is continuously adjustable and selectable relative to the input waveform itself.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a schematic diagram of a prior art trigger level control circuit;

FIG. 2 is a schematic diagram of a first trigger level control circuit in accordance with the present invention;

FIG. 3 is a schematic diagram of a second trigger level control circuit in accordance with the present invention;

FIG. 4 is a schematic diagram of another trigger level control circuit in accordance with the present invention which is similar to the FIG. 2 circuit; and FIG. 5 is a representation of an input waveform.

DETAILED DESCRIPTION

Referring to FIG. 1, illustrating a prior art trigger circuit, an input waveform 10 is applied to the control grid of the first stage 12 of a differential amplifier. The second stage 14, having its cathode coupled in common with the cathode of stage 12, is provided an input signal from variable tap 16 of a potentiometer 18. The end points of the potentiometer are connected to specific voltages, e.g. a positive voltage and a negative voltage, such that tap 16 is operable to select some intermediate voltage therebetween. The voltage at tap 16 acts to bias stage 14 such that a trigger initiating output occurs at the anode of stage 14 only when input waveform 10 reaches a desired level. This level is selected by varying the tap 16 of potentiometer 18 and therefore corresponds to or has a definite relation to an absolute voltage level at the tap. If an input waveform occurs which doesn't reach this level, the potentiometer must be readjusted. Moreover, the circuit voltages applied at either end of potentiometer 18 must always be greater than the maximun values of the input waveform if one is to have a choice of a triggering level thereon.

In accordance with the present invention, a triggering point can be selected in terms of a portion of the input waveform or a percent of the input waveform amplitude without regard to the actual value of waveform amplitude. Therefore, triggering continues to take place even though the input waveform changes in amplitude value. Referring to FIG. 2, illustrating an embodiment of the present invention, input waveform 20 is applied to the grid of a first stage 22 of a differential amplifier by way of a d.c. input path 21. A second stage 24 of the differential amplifier, having its cathode connected in common with stage 22, derives its grid control voltage from tap 26 of potentiometer 28. Again this stage functions to provide an output signal at its anode when input waveform 20 reaches a level as determined by bias at tap 26. However, in this instance, the end points of potentiometer 28 are not connected to absolute voltage levels. Instead, one end of potentiometer 28 is connected to a storage means comprising a capacitor 30 while the other end of potentiometer 28 is connected to another storage means comprising capacitor 32. The remaining terminals of capacitors 30 and 32 are returned to ground. A first unilateral conductor comprising a diode 34 is provided with its cathode connected to capacitor 30 while its anode is connected to d.c. input path 21. A second unilateral conductor comprising diode 36 is oppositely poled with its anode connected to capacitor 32 and its cathode connected to d.c. input path 21. The voltage level on capacitor 30 is the result of charging thereof through positively poled diode 34 from d.c. input path 21 and is therefore the positive peak voltage of the input waveform. Similarly, the voltage across capacitor 32 is determined by the charging thereof through negatively poled diode 36 from the d.c. input path 21. The resultant voltage is the negative peak of the input waveform. Variable tap 26 will select a control signal voltage corresponding to some intermediate point between the positive and negative peaks of the input waveform, and this voltage is then coupled via control circuit connection 38 to stage 24. The potentiometer 28 comprises a variably adjustable means delivering a selectable output voltage which may be adjusted along the potentiometer between values stored on capacitors 30 and 32, and any trigger initiating output is selected thereby corresponding to any point on the input signal waveform. As the input waveform changes, of course, the values stored on storage capacitors 30 and 32 are changed similarly whereby a triggering level always corresponds to a preselected point on the input waveform and takes place at a time corresponding thereto regardless of changes in the absolute value of the waveform.

FIG. 3 illustrates a second embodiment of the present invention. In this embodiment, a triggering level is also selected relative to the input waveform rather than relative to absolute voltage values. However, the control circuit in the FIG. 3 embodiment comprises a current feedback path. The FIG. 3 arrangement is more adaptable to transistorized circuitry especially where a large signal waveform amplitude swing is encountered, since the feedback arrangement has the effect of reducing circuit currents. The same reference numerals are employed in FIG. 3 as were employed in FIG. 2 as far as applicable.

A signal input waveform 20, here taken to vary between a positive one volt and a negative one volt, is applied to amplifier stage 40 via a d.c. input signal path 21 including resistor 116. Stage 40 comprises an NPN transistor having its base 42 connected to path 21, its collector 44 connected to a positive source, and its emitter 46 connected in driving relation to a storage circuit. The storage circuit includes a first diode 34 having its anode connected to emitter 46 and its cathode connected to one terminal of storage capacitor 30, the opposite terminal of which is returned to ground. The storage circuit also includes a second similarly connected storage capacitor 32 having an oppositely poled diode 36 serially coupled between the capacitor and emitter 46 by way of another diode 48. The latter diode may be replaced with a direct connection if so desired, but contributes certain advantages to circuit operation. A voltage drop exists across each of the diodes 34 and 36, on the order of approximately 0.6 volts. If diode 48 were replaced by a direct connection, a voltage swing of ±0.6 volts in the input signal would be necessary before either capacitor 30 or 32 would start charging. Therefore, the bottom diode, 36, is prebiased to a minus 0.6 volts by means of diode 48 in order to reduce the hysteresis effect in operation of the circuit. The diode 48 has its anode connected to emitter 46 and its cathode connected to the cathode of diode 36 as well as transistor emitter resistor 50, the latter being returned to a negative supply voltage.

The storage circuit as thus described acts to store the positive peak voltage of the input waveform on capacitor 30 and the negative peak of the input waveform on capacitor 32. These peak values are designated as plus one volt and minus one volt, respectively, for purposes of illustration. A potentiometer 28 is connected between the ungrounded terminals of capacitors 30 and 32, and is provided with a movable tap 26. The potentiometer comprises the variably adjustable means for delivering a variable output signal voltage on tap 26 which is intermediate the voltage stored on capacitors 30 and 32 and the specific value of which is determined according to the exact position of tap 26. As in the previous embodiment, a triggering point on the input waveform can be selected with tap 26 relative to the peak values of the input waveform rather than relative to some absolute voltage value.

The variably adjustable voltage, comprising a value intermediate the input waveform peak values, is coupled to a control circuit for applying such variably adjustable signal for controlling the level at which a trigger initiating output is produced. The control circuit in the FIG. 3 embodiment is a current feedback circuit applying the variably adjustable signal value in a manner for repositioning the input waveform. This negative feedback control circuit includes an integrating amplifier comprising an input resistor 52 coupled between tap 26 and the base input connection 54 of an emitter-follower NPN transistor 56. The collector 58 of transistor 56 is returned to a positive supply voltage while its emitter 60 is coupled to base 62 of PNP inverting transistor 64. The emitter 66 of transistor 64 is grounded while its collector 68 is coupled to a negative supply voltage through load resistor 70. A feedback capacitor 72 is coupled between base input connection 54 of transistor 56 and collector 68 of transistor 64. The circuit including transistors 56 and 64 and capacitor 72 comprises a Miller integrator for smoothing and maintaining for a short period the value of the variably adjustable output obtained from tap 26 of potentiometer 28.

The integrated output at the collector 68 of transistor 64 is coupled to emitter 74 of an NPN transistor 76 connected in a common base configuration. The coupling element between collector 68 and emitter 74 comprises a coupling resistor 78 which determines the voltage to current conversion in the control feedback circuit of this embodiment. The emitter 74 of transistor 76 is returned to a negative voltage through resistor 80 while its base 82 is coupled to a negative voltage. The collector 84 of transistor 76 is connected to d.c. input path 21 and in addition to a load resistor 86 similarly connected to d.c. input path 21. The remaining terminal of resistor 86 is connected to a positive voltage source.

The FIG. 3 embodiment also includes an output differential amplifier in which there is a first stage 88 comprising a PNP transistor having its base 90 connected to emitter 46 of transistor amplifier stage 40, and a second PNP transistor stage 92. Emitters 94 and 96 of transistor stages 88 and 92 are coupled by means of a stabilizing resistor 98. Emitters 94 and 96 are returned to sources of positive voltage through resistors 100 and 102 respectively while collector 104 of transistor stage 88 is connected to a negative voltage source via resistor 106. Collector 108 of transistor stage 92 is also connected to a negative voltage source by way of resistor 110. Base 112 of transistor stage 92 is suitably grounded. The differential amplifier comprising transistor stages 88 and 92 is operable to produce an output trigger or trigger initiating signal when a predetermined signal level is provided at base 90 of transistor stage 88. When a certain signal level is reached at base 90 of transistor stage 88, the bias level of transistor stage 92 will be exceeded such that a trigger initiating output is produced. This output may be derived, for example, from collector 108 of transistor stage 92. The trigger initiating output is suitably applied to a trigger generator or other conventional circuitry included in a cathode ray oscilloscope device.

The FIG. 3 embodiment acts to determine a preselected triggering level employing the feedback control circuit including transistors 56, 64, and 76. In a manner hereinbefore described, the positive and negative peaks of the signal waveform are stored on capacitors 30 and 32 respectively and the intermediate triggering level is selected between these values with variable tap 26. This voltage level is integrated in the integrating amplifier which includes transistors 56 and 64 and feedback capacitor 72. Transistor 64 provides the inversion necessary in the Miller integrator circuit while the emitter-follower transistor 56 provides drive therefor. Coupling resistor 78 determines the amount of current drawn through common base transistor 76 in correspondence with the integrated voltage at collector 68 of transistor 64. This current as drawn, for example, through load resistor 86 has the effect of repositioning the input waveform in acordance with the desired triggering level. Since there has been an inversion in the control circuit, the current which is supplied via transistor 76 is in the nature of negative feedback and reduces the current swing requirements for circuit components as compared with the embodiment of FIG. 2.

During operation, the differential amplifier comprising transistor stages 88 and 92 may be biased such that a trigger intiating output is produced at or near the zero volt level of input signal waveform, and in the absence of the negative control feedback. When the input signal waveform 20 rises through the zero level, this signal is applied through transistor amplifier stage 40 to the base 90 of stage 88, and a trigger initiating output is produced at collector 108 of stage 92. The same situation also obtains with the control feedback arrangement in operation, providing the tap 26 is set midscale of the potentiometer 28 or at the zero volt level. Now, if the tap 26 is advanced toward a more positive voltage, that is towards the positive waveform peak of plus one volt, the control feedback circuit subtracts such voltage from the input waveform. The resulting waveform with the voltage subtracted therefrom is indicated at 114. As now appears, the resultant waveform 114 crosses the zero axis at a point which is located toward the upper part of the waveform. The exact point of triggering is, of course, determined by the setting of tap 26.

If tap 26 is advanced in a negative direction from the midpoint of potentiometer 28, the opposite effect takes place. That is, the input waveform at d.c. input path 21 is raised relative to the zero axis whereby such zero axis will be reached at some lower point on the waveform during operation of the circuit. In either case, the trigger initiating output from differential amplifier comprising stages 88 and 92 will occur, according to the present example, approximately when such waveform crosses the zero volt axis. As can be seen, triggering is thus adjustable relative to the input waveform at any point thereon, taking place at a time corresponding thereto, and will not vary with changes in signal amplitude.

FIG. 4 illustrates in some detail a preferred circuit of the FIG. 2 type as embodied in a particular oscilloscope. While the FIG. 4 circuit operates in the same manner as the circuit of FIG. 2, the FIG. 4 circuit has the advangtage of faster operating speed in quickly adapting to input signal changes, e.g. in following changes in a low frequency, narrow pulse input of varying amplitude. In the FIG. 4 circuit, unilateral conductor means for charging the individual peak storage capacitors comprise transistors which quickly charge the storage capacitors to desired values.

Referring to FIG. 4, an input waveform is applied at input terminal 120 with respect to ground terminal 122. A resistor 124 couples terminal 120 to the gate electrode of the field effect transistor 126, having its drain terminal connected to a positive voltage through resistor 128, and its source terminal connected to the drain terminal of field effect transistor 130. The field effect transistor 130 acts as a current source for transistor 126, and the two field effect transistors are desirably formed on the same semiconductor chip for temperature compensation purposes. Diodes 132 and 134 protect the field effect transistor 126 from voltage extremes as may be applied at input terminal 120.

The field effect transistor 126 provides a very high input impedance. The output of transistor 126 at the source terminal thereof is connected to the base of emitter-follower transistor 136, transistor 36 causing a further impedance stepdown. The output at the emitter terminal of transistor 136 is applied to the base of transistor 138, the latter forming part of a differential amplifier with transistor 140, and such output at the emitter terminal of transistor 136 is also applied to the base of an emitter-follower transistor 142. The last mentioned transistor produces a further impedance reduction while presenting an output proportional to its input across potentiometers 144 and 146 coupled between the emitter of transistor 142 and a voltage divider 148–150. The remaining end of the voltage divider is connected to −15 volts. The movabe tap of potentiometer 146 is connected to the base of transistor 152, the latter forming a Darlington circuit with transistor 154 wherein the emitter of transistor 152 is connected to the base of transistor 154. The collectors of transistors 152 and 154 are coupled to a voltage source. The 152–154 circuit provides appreciable current gain, and here provides the unilateral conductor means for charging a storage capacitor in a given polarity direction. The storage capacitor, 156, has one terminal grounded, and the opposite terminal is coupled to the emitter of transistor 154 through resistor 158. The Darlington circuit rapidly charges up capacitor 156 to a voltage representation of a positive peak of the signal input. The capacitor 156 tends to retain this charge since the capacitor cannot be discharged through the emitter of transistor 154, but must discharge slowly through resistor 160 coupled between the emitter of transistor 154 and −15 volts via switch 162.

The movable contact of potentiometer 144 is similarly connected to the base of transistor 164, forming a Darlington circuit with transistor 166. Thus, the emitter of transistor 164 drives the base of transistor 166, while the emitter of transistor 166 provides current for charging storage capacitor 168 through resistor 170. The 164–166 transistor circuit comprises the unilateral conductor means for charging capacitor 168 to a value representative of the negative peak of the input signal, inasmuch as the negative charge on capacitor 168 cannot discharge through the emitter of transistor 166, but must discharge more slowly through resistor 172. Resistor 172 couples the emitter of transistor 166 to +15 volts via switch 174. Switch 174 is ganged with switch 162.

The positive charge on capacitor 156 and the negative charge on capacitor 168 establish the voltages at either end of potentiometer 176, the latter comprising the variably adjustble means delivering a selectable output voltage. Such output voltage is adjustable between the values stored on the capacitors by movement of variable tap 178.

A first negative feedback amplifier circuit comprising transistors 180 and 182 is disposed between capacitor 156 and the upper end of potentiometer 176. Capacitor 156 is coupled to the base of transistor 180 via resistors 158 and 181. The collector of transistor 180 is connected to the base of transistor 182, and a temperature compensating diode 184 interconnects the emitter of transistor 180 and the collector of transistor 182, wherein the anode of diode 184 is connected to the collector of transistor 182. The collector of transistor 182 is returned to a positive voltage through load resistor 186. A base resistor 188 is interposed between the base of transistor 182 and the emitter thereof, and a further resistor 190 is connected between the emitter of transistor 182 and switch 162.

The collector of transistor 180 drives the base of transistor 182, and the latter provides an output at its collector which is applied at a first end of potentiometer 176. The negative feedback connection comprising diode 184 reduces the loading of the circuit upon capacitor 156. Thus, a voltage representative of the capacitor voltage is established at a first end of the potentiometer without materially affecting the capacitor voltage.

A similar circuit comprising transistors 192 and 194 couples capacitor 168 to the remaining end of potentiometer 176. The capacitor 168 is coupled to the base of transistor 192 via resistors 170 and 191, and the collector of transistor 192 is connected to the base of transistor 194. A base resistor 193 for the latter transistor is disposed between the base and emitter thereof, while a resistor 196 is disposed between the emitter of transistor 194 and switch 174. Diode 198 is located between the emitter of transistor 192 and the collector of transistor 194, the cathode of the diode being connected to the collector of transistor 194. Resistor 200 in series with variable resistor 202 provides a load for transistor 194, connecting the collector thereof to a −15 volts, and the collector of transistor 194 is also connected to the remaining end of potentiometer 176. The circuit comprising transistors 192 and 194 operates in substantially the same manner as the 180–182 circuit. Variable resistor 202 is used to adjust or center the output of potentiometer tap 178 for a mid range setting thereof.

The value at the movable tap 178 of potentiometer 176, representative of a selectable voltage level between the peaks of the input waveform, is coupled via a control circuit comprising emitter-follower transistor 204 to the base of transistor 140, the latter forming a differential amplifier circuit with transistor 138. The emitters of transistors 138 and 140 are coupled by way of voltage protection diodes 206 and 208, respectively, to one end of a common emitter resistor 210, the opposite end of which is connected to a −15 volts. Capacitor 212 further interconnects the emitters of transistors 138 and 140. Transistors 138 and 140 have their collectors respectively connected to a voltage established by Zener diode 214 through respective load resistors 216 and 218. Transistors 138 and 140 form the first stage of a differential amplifier for ultimately producing a trigger-initiating output.

The first differential amplifier stage, 138–140, is connected to a second differential amplifier stage comprising transistors 220 and 222 respectively, wherein the base of transistor 220 is connected to the collector of transistor 138 and the base of transistor 222 is connected to the collector of transistor 140. The emitter of transistor 220 is coupled to a −15 volts through current-source resistor 224. Similarly, the emitter of transistor 222 is returned to a −15 volts through current-source resistor 226. A gain-determining resistor 228 shunted by capacitor 230 is disposed between the emitter of transistors 220 and 222.

The differential amplifier circuitry is designed to shift outputs between the collectors of transistors 220 and 222 as the input signal coupled to the base of transistor 138 crosses the level established by tap 178 of potentiometer 176 at the base of transistor 140. Thus, as the input signal as applied at the base of transistor 138 crosses the level established by movable tap 178 in a positive direction, the current from the resistor 210 will shift from transistor 140 to transistor 138 producing a negative-going signal at the collector of transistor 138 and a positive-going signal at the collector of transistor 140. In turn, the current provided by resistors 224 and 226 will shift from the emitter-collector path of transistor 220 to the emitter-collector path of transistor 222.

The collectors of transistors 220 and 222 are connected to a switching circuit comprising diodes 232, 234, 236, and 238. The cathodes of diodes 232 and 234 are connected to the collector of transistor 220, while the cathodes of diodes 236 and 238 are connected to the collector of transistor 222. The anode of diode 232 is returned to ground through resistor 268. The anodes of diodes 234 and 236 are connected together, and are coupled to a tunnel diode trigger stage including tunnel diode 240. The last mentioned junction of diode anodes is coupled to the cathode of tunnel diode 240 through a resistor 242 and an inductance 244 connected in series. Inductance 244 provides isolation allowing the voltage across tunnel diode 240 to change rapidly after a relatively slower build-up in current through inductance 244. The anode of tunnel diode 240 is connected to a source of voltage by way of resistor 246 while a capacitor 248 holds the voltage at the tunnel diode anode to a substantially constant value. The tunnel diode is shunted by a circuit comprising inductance 250 in series with a parallel combination of resistor 252 and capacitor 254. This shunting circuit enhances Schmitt trigger action of the tunnel diode in switching from one voltage level to another with reasonable hysteresis, and also forms a spike-forming circuit as hereinafter more fully described.

A slope switch 256 is interposed between a +15 volt source and the anode of diode 232. The same point is coupled to the base of transistor 258 through resistor 260, the emitter of the latter transistor being returned to a +15 volts. The collector of transistor 258 is returned to ground through resistor 262, and is also connected to the anode of diode 238.

Slope switch 256 is employed to determine whether a triggering output will be produced at tunnel diode 240 by a positive-going portion of the input waveform or by negative-going portion of the input waveform. Switch 256 selects the positive-going slope in the closed position shown in FIG. 4. Let us assume as before the input signal as coupled to the base of transistor 138 rises through the level as applied at the base of transistor 140. As hereinbefore described, current output is shifted from the collector of transistor 220 to the collector of transistor 222 as the signal crosses the level established by potentiometer 176 in a positive direction. Before such shift, the collector current of transistor 220 is drawn through switch 256 and diode 232, reverse-biasing diode 234. Likewise, transistor 258 is held in a cut-off condition, and therefore diode 238 is similarly reverse-biased. Current from the collector of transistor 220 does not reach tunnel diode 240. Now, as the current is shifted to the collector of transistor 222, this current flows through diode 236 and tunnel diode 240, in parallel with elements 250, 252, and 254. The increased current through the tunnel diode switches the tunnel diode from its low voltage state to its high voltage state, for producing a triggering output. This output is converted into a voltage spike by inductance 250. When the voltage first changes across the tunnel diode, this voltage initially appears across inductance 250 and then transfers to resistor 252. The resulting negative-going voltage spike across inductance 250 is applied to pulse amplifier transistor 264 having its collector coupled to ground through the primary of transformer 266. The trigger pulse is produced at the secondary of transformer 266 and may be applied for operating a sweep gate multivibrator in an oscilloscope, by means of which the horizontal time base sweep is initiated.

With slope switch 256 in the lower or negative position, the tunnel diode 240 will switch from its low voltage state to its high voltage state as the input signal as applied to the base of transistor 138 passes through the level applied at the base of transistor 140 in a negative-going direction. This transition causes current to switch from transistor 222 to transistor 220. Before such transition, with switch 256 thrown to the lower position, transistor 222 will draw current through diode 238 and transistor 258, back-biasing diode 236 coupled to the tunnel diode. Transistor 258 is turned on with the switch in the lower position. Diode 232 is back-biased since its anode is essentially connected to ground via resistor 268. Now, when current switches to the collector of transistor 220, this current will flow through diode 234 and the tunnel diode 240, switching the latter to its high voltage state and producing a triggering output.

As can be seen, the FIG. 4 circuit employs essentially the same elements and operates in the same manner as the circuit illustrated in FIG. 2, except the circuit is faster acting. Appreciable drive is provided the memory capacitors 156 and 168, while the input is isolated therefrom by impedance transforming circuitry. Also, circuitry is provided for minimizing loading of the memory capacitors, whereby the peak values stored will be more accurately maintained. A two stage differential amplifier is also illustrated together with the trigger slope selecting circuitry and the tunnel diode trigger generator.

As in the case of the previous circuits, the extremes of the input signal are stored on the memory capacitors, i.e. capacitors 156 and 168 in FIG. 4, and the selection of the particular point on the input waveform is made with respect to the signal waveform itself rather than with respect to an arbitrary voltage range. Thus, the movable tap 178 of potentiometer 176 is adjusted until triggering takes place at a particular, desired, and unambiguous triggering point on the waveform, and a repetitive oscilloscope display will occur each time this point is reached. The waveform may be and usually is complex, making a selection of the trigger-point, amplitude-wise, very desirable. The triggering point may be selected above the noise level or above other undesired information. For example, triggering may be selected to occur at a point at level "A" on the FIG. 5 input waveform. Any point on the complex waveform may be selected by means of the potentiometer with respect to the waveform, and this triggering selection will hold regardless of changes in the overall amplitude of the waveform, rendering continual adjustment unnecessary. Triggering will not be lost as the waveform changes in amplitude, nor will triggering occur on an undesired part of the waveform as the input changes in amplitude. Moreover, selection of the triggering point is made more easily when the full scale of the potentiometer 176 is always representative of the peak to peak value of the waveform, rather than some arbitrary and higher voltage range.

It may be for some purposes be desired to be able to change circuitry operation from a preferred triggering mode relative to the input waveform itself, to triggering relative to an arbitrary voltage scale. For this purpose, ganged switches 162 and 174 may be operated to change from a peak to peak automatic mode to an absolute mode. With the switches 162 and 174 in the position shown, capacitors 156 and 168 can discharge whereby these capacitors can follow the "envelope" of the input signal. Discharge takes place through resistors 160 and 172. However, with switches 162 and 174 opened, the capacitors charge up but are not readily discharged. This charging is not dependent in such case upon the input signal, but takes place from the positive supply through resistor 186, transistor 182, resistor 190, and resistors 160 and 158, in the instance of the upper circuit. With the switch 162 thrown to the right, the capacitor 156 thus changes up "out of the way" whereby the potentials at the ends of potentiometer 176 are set by the overall voltage divider including resistors 186, potentiometer 176, and resistors 200 and 202. The lower capacitor 168 is charged in a similar manner with switch 174 concurrently thrown to the right. Change to an absolute mode is thereby made possible with a minimum of change in circuitry coupled to the signal channel itself.

In addition to providing trigger signals or trigger initiating signals, the circuit according to the present invention finds utility in determining or recording reoccurences of various wave shapes, e.g., the circuitry according to the present invention is useful in counter operation. For example, it may be desired to count electrically the output impulses from a scintillation counter or the like even though such pulses may vary in amplitude. The present invention is useful in producing an output corresponding to each such inpulse even though the absolute value of the impulses may vary from one to the next.

While I have shown and described several embodiments of my invention, it will be apparent to those skilled in the art that many changes and modifications may be made without departing from my invention in its broader aspects.

I claim:

1. A circuit for providing a triggering signal at a voltage level which is a selectable fixed fraction of the peak-to-peak voltage level of each input waveform of a plurality of successive waveforms which may vary in peak-to-peak amplitude and D.C. level, comprising:

a signal path for said waveform, a first storage capacitor and first transistor means for coupling said first storage capacitor to said input signal path, a second storage capacitor and second transistor means of opposite conductivity type to said first transistor means for coupling said second storage capacitor to said input signal path, a continuously adjustable resistance means which provides at an adjustable tap a selectable output voltage between two voltages applied to two fixed terminals of said resistance means, means coupling one fixed terminal of said resistance means, to one of said storage capacitors and the other fixed terminal to the other of said storage capacitors, said first and second storage capacitors acting to store peak voltage levels of the input waveforms and the adjustable tap selecting an output voltage between said peak voltage levels thereof, a differential amplifier comprising first and second amplifying devices whose current carrying terminals are coupled together to establish differential action therebetween, means connecting the control terminal of one of said amplifier devices to said input signal path, and means coupling the adjustable tap of said resistance means to the control terminal of the other amplifier device for determining the output producing voltage of said differential amplifier in correspondence with the setting of said adjustable tap of said resistance means.

2. A circuit for providing a triggering signal at a voltage level which is a selectable fixed fraction of the peak-to-peak voltage level of a waveform which may vary in peak-to-peak amplitude and D.C. level, comprising:

an input path, an amplifying device connected to receive its input from said input path for providing a triggering output, means coupled to said input path comprising a first storage element and a first unilateral conductor for coupling said first storage element to said input path in a first polarity sense to store a first peak value of the input waveform, means coupled to said input path comprising a second storage element and a second unilateral conductor for coupling said second storage element to said input path in a second polarity sense to store a second peak value of the input waveform, adjustable means coupled between said storage elements for selecting an electrical value between said peak values to determine said fraction of said peak-to-peak values of the input waveform, an integrating amplifier receiving the output from said adjustable means, and means for coupling the output of said integrating amplifier to said input path to adjust the D.C. level of the input waveform such that a triggering output is produced by said amplifying device at said selected voltage level.

3. The circuit according to claim 2 further including a differential amplifier receiving the output of said amplifying device and operable to produce a triggering output when a predetermined voltage input level thereof is reached.

4. The circuit according to claim 2 wherein said amplifying device comprises a transistor having its base directly coupled to said input signal path and wherein said unilateral conductors couple the emitter of said transistor to said storage elements, said storage elements comprising capacitors coupled between the respective unilateral conductors and a point of common reference potential.

5. The circuit according to claim 4 wherein said adjustable means comprises a potentiometer coupled between said capacitors, said potentiometer having a variable tap coupled to the input of said integrating amplifier, said integrating amplifier comprising a transistor amplifier connected in a Miller circuit.

6. The circuit according to claim 5 wherein said integrating amplifier includes a first inverting transistor with an integrating capacitor coupled between the input and output thereof, said circuit also including an emitter follower transistor interposed between the input of said inverting transistor and said integrating capacitor.

7. The circuit according to claim 6 wherein means couple the output of said integrating amplifier to said input path, said last mentioned means comprising a common base transistor amplifier circuit having its emitter coupled to the output of said integrating amplifier and having its collector coupled to the input path, and a load resistor for said last mentioned transistor which is also coupled to said input path.

8. A circuit having an input path for waveforms which may vary in peak-to-peak amplitude and D.C. level, including means for deriving from a waveform applied to said input path a voltage corresponding to a selected fixed fraction of its peak-to-peak voltage, means controlled by the simultaneous application thereto of each waveform and said fixed fraction of the peak-to-peak voltage for providing an output signal when the instantaneous voltage of said waveform reaches a level corresponding to said fixed fraction of the peak-to-peak voltage, pulse generating means for generating an output pulse of predetermined form upon each energization thereof, and means for applying the output signal from said controlled means to the pulse generating means for energizing it.

9. A circuit according to claim 8, wherein the means for deriving the fixed fraction of the peak-to-peak voltage includes storage means for storing the respective upper and lower peak values of the input waveform, an impedance connected between the storage means, and means for tapping off the selected fraction of said stored peak-to-peak voltage from the impedance.

10. A circuit according to claim 9, wherein the means for tapping off the selected fraction comprises an adjustable potentiometer.

11. A circuit according to claim 8 including means connected to said controlled means for rendering it operative to provide said output signal only when the slope of the waveform is of a selected polarity.

12. A circuit according to claim 8 wherein the controlled means comprises a differential amplifier, one of the amplifier inputs being energized by a waveform and the other of the inputs being energized by the selected fixed fraction of the peak-to-peak voltage of said waveform.

13. A circuit according to claim 12, wherein the output pulse is provided by a switching device upon energization thereof, and means for selectively operating said differential amplifier to energize said switching device by either the increase or decrease of the waveform voltage at the amplifier input to reach the level corresponding to said fixed fraction of the peak-to-peak voltage.

14. A circuit according to claim 8 further including means for supplying the output pulse to the sweep circuit of a cathode ray tube to initiate its operation.

15. A circuit having an input path for waveforms which may vary in peak-to-peak amplitude and D.C. level, including means for deriving from a waveform applied to said input path a voltage corresponding to a selected fixed fraction of the peak-to-peak voltage of said waveform, means controlled by the simultaneous application thereto of each waveform and said selected fixed fraction of the peak-to-peak voltage for providing an initiating signal when the instantaneous voltage of said waveform has reached a level corresponding to said fixed fraction of the peak-to-peak voltage, and means rendered operative by said initiating signal for generating a trigger pulse of a predetermined form unrelated to the shape of the waveform independently of further control by said waveform or said fixed fraction of the peak-to-peak voltage.

16. A circuit according to claim 15, wherein the generated trigger pulse is a spike voltage pulse.

17. A circuit according to claim 15, wherein the means for deriving a voltage corresponding to a selected fixed fraction of the peak-to-peak voltage, comprises a first storage means for storing the upper peak voltage level of the waveform, a second storage means for storing the lower peak voltage level of the waveform, a resistance connected between the storage means, and means for selectively tapping off a desired fraction of the voltage across the resistance.

* * * * *